(12) United States Patent
Park

(10) Patent No.: US 8,047,098 B2
(45) Date of Patent: Nov. 1, 2011

(54) STEERING WHEEL AND METHOD OF MANUFACTURING THE SAME

(75) Inventor: Joonmo Park, Gyeonggi-do (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 295 days.

(21) Appl. No.: 12/167,006

(22) Filed: Jul. 2, 2008

(65) Prior Publication Data

US 2009/0152936 A1    Jun. 18, 2009

(30) Foreign Application Priority Data

Dec. 15, 2007    (KR) .................. 10-2007-0131758

(51) Int. Cl.
*B62D 1/04*    (2006.01)
(52) U.S. Cl. ........................................ 74/552
(58) Field of Classification Search ............... 74/552, 74/558; 280/731, 771
See application file for complete search history.

(56) References Cited

U.S. PATENT DOCUMENTS

| | | | | |
|---|---|---|---|---|
| 2,623,405 | A * | 12/1952 | Sampson | 74/552 |
| 2,705,816 | A * | 4/1955 | Sampson | 264/254 |
| 4,581,954 | A * | 4/1986 | Uchida | 74/552 |
| 6,564,674 | B2 * | 5/2003 | Ishii et al. | 74/552 |
| 6,637,289 | B2 | 10/2003 | Kreuzer et al. | |
| 6,668,682 | B1 * | 12/2003 | Emeneth et al. | 74/552 |
| 6,668,683 | B2 | 12/2003 | Fleckenstein | |
| 6,761,086 | B2 * | 7/2004 | Kreuzer et al. | 74/552 |
| 6,877,397 | B2 * | 4/2005 | Albayrak et al. | 74/552 |

FOREIGN PATENT DOCUMENTS

| | | | |
|---|---|---|---|
| JP | 05105085 A * | 4/1993 | |
| JP | 2000-127982 | 5/2000 | |
| JP | 2001-213327 | 8/2001 | |

* cited by examiner

*Primary Examiner* — Vicky Johnson
(74) *Attorney, Agent, or Firm* — Morgan, Lewis & Bockius LLP

(57) ABSTRACT

A steering wheel includes a rim that is rotatable around a steering shaft. The rim includes an armature; a first rim portion surrounding the armature; and a second rim portion, covering part of the surface of the first rim portion. A method of manufacturing a steering wheel includes providing an armature; injection molding a first rim portion such that the it surrounds the armature; injection molding a second rim portion; and attaching the first and second rim portions such that the second rim portion covers part of the surface of the first rim portion.

5 Claims, 2 Drawing Sheets

STEERING WHEEL AND METHOD OF MANUFACTURING THE SAME

CROSS-REFERENCE TO RELATED APPLICATIONS

The present application is based on, and claims priority from, Korean Application Serial Number 10-2007-0131758, filed on Dec. 15, 2007, the disclosure of which is hereby incorporated by reference herein in its entirety.

FIELD OF THE INVENTION

The present invention relates to a decorative steering wheel and a method of manufacturing the steering wheel.

BACKGROUND OF THE INVENTION

Many steering wheel rims are made of expensive injection molded polyurethane. Some include portions with wood patterned surfaces.

SUMMARY OF THE INVENTION

A steering wheel includes a rim that is rotatable around a steering shaft. The rim includes an armature; a first rim portion surrounding the armature; and a second rim portion, covering part of the surface of the first rim portion.

Another part of the surface of the first rim portion may have a decorative pattern. A cover may be provided on the second rim portion. The first rim portion may have at least one seat in which the second rim portion is mounted. The second rim portion may be made of a first shell and a second shell. Each shell may have a bend that is mounted in one of the seats. The first shell may have a groove, and the second shell may have a protrusion mounted in the groove. A space may be defined between the two rim portions A method of manufacturing a steering wheel includes providing an armature; injection molding a first rim portion such that the it surrounds the armature; injection molding a second rim portion; and attaching the first and second rim portions such that the second rim portion covers part of the surface of the first rim portion.

BRIEF DESCRIPTION OF THE DRAWINGS

For better understanding of the nature and objects of the present invention, reference should be made to the following detailed description with the accompanying drawings, in which.

DETAILED DESCRIPTION OF THE PREFERRED EMBODIMENTS

Figure 1:
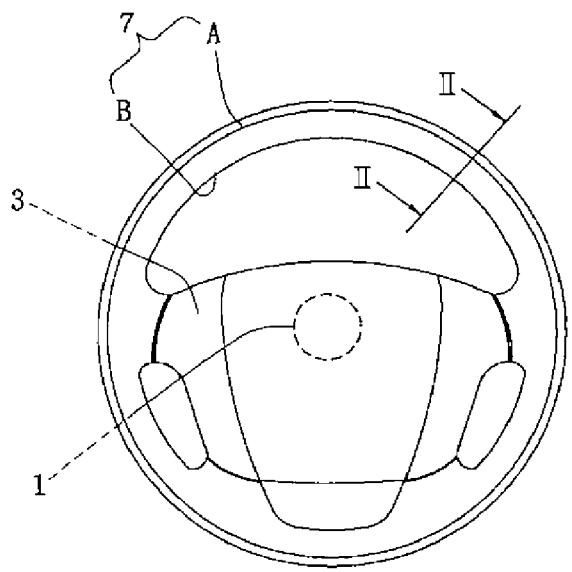
FIG. 1 is a front view of a steering wheel according to an exemplary embodiment.
Figure 2:
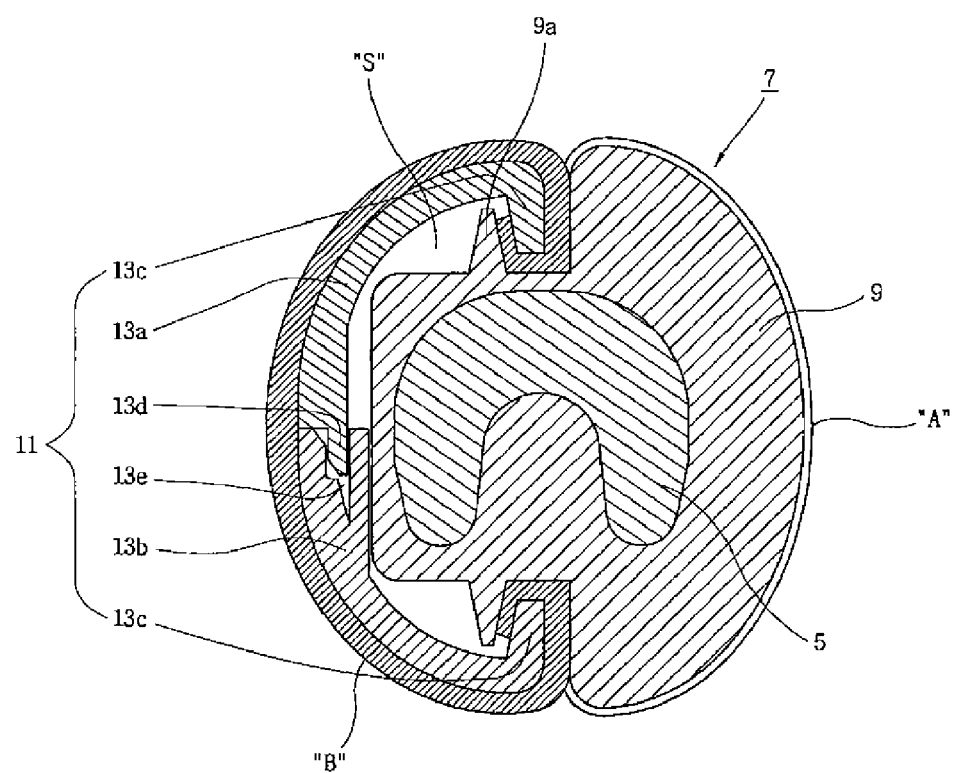
FIG. 2 is a cross-sectional view taken along the line II-II of FIG. 1.

Embodiments of the invention are described hereafter in detail with reference to the accompanying drawings.

As shown in the figures, a steering wheel according to an embodiment of the invention includes a boss 1 that is connected with a steering shaft (not shown), a plurality of spokes 3 radially disposed around boss 1, and a rim 7 that is coaxial with boss 1, attached to the outer ends of spokes 3. Rim 7 is radially divided into an outer rim 9 and an inner rim 11 that join at the center of rim 7.

Outer rim 9 covers the entire circumference of a metallic armature 5 of rim 7 and may have a decorative pattern A, such as a wood pattern, on its surface. Outer rim 9 may be formed by injection molding of acrylonitrile butadiene styrene (ABS) resin around the surface of armature 5, and a film with the decorative pattern A may then be applied to the surface of outer rim 9.

Inner rim 11 is attached to outer rim 9. A soft pliable cover B may be attached to the surface of inner rim 11. Inner rim 11 may also be formed by injection molding of ABS resin. Cover B may be made of a soft material, such as leather or synthetic leather.

Outer rim 9 may include a seat 9a to hold inner rim 11 in place. Inner rim 11 may be made of a shell 13 that has a semi-arc cross section, and soft pliable cover B attached to the surface of shell 13.

Shell 13 is composed of an upper shell 13a and a lower shell 13b, each with one end supported by seats 9a. The other ends of the upper shell 13a and the lower shell 13b are connected to each other.

The upper shell 13a and the lower shell 13b may each have a bend 13c at one end that is placed in a respective one of the seats 9a. A protrusion 13d, or a groove 13e that is fitted on protrusion 13d, is provided at the other end.

A space S may be defined between the shell 13 and the outer rim 9, such that the total weight of rim 7 is reduced.

Figure 3:
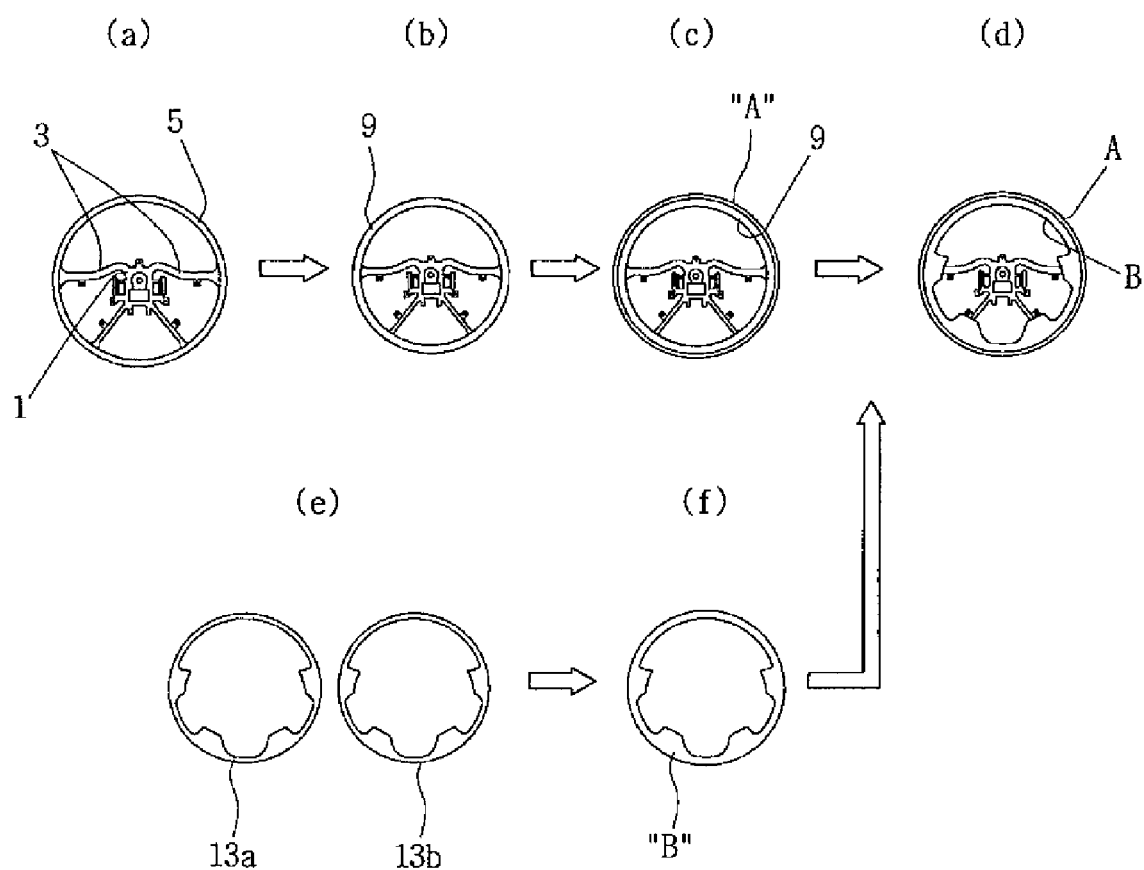
FIG. 3 illustrates a manufacturing process of the steering wheel of FIGS. 1 and 2.

The above-described steering wheel may be made as follows, referring to FIG. 3. As shown in FIG. 3A, boss 1, spokes 3, and armature 5 are formed first. Next, as shown in FIG. 3B, outer rim 9 is injection molded onto armature 5. Next, as shown in FIG. 3C, wood pattern A is applied to at least a portion of outer rim 9, such as the outer circumferential edge in the illustration. Next, as shown in FIG. 3E, shell 13 is formed by injection molding upper and lower shells 13a, 13b. Next, as shown in FIG. 3F, cover B is attached onto the surface of shell 13. Next, as shown in FIG. 3D, the outer rim 9 is attached to the inner rim 11. Thereafter, the steering wheel is additionally provided with a variety of electrical parts and exterior materials for boss 1 and spokes 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A steering wheel, comprising a rim configured to rotate around a steering shaft, wherein the rim comprises:
   an armature;
   a first rim portion fully surrounding the armature; and
   a second rim portion, covering the first rim portion at a part of a surface of the first rim portion;
   wherein the first rim portion forms an outer portion of the rim and has a decorative pattern mounted thereon and the second rim s portion forms an inner s portion of the rim and has a cover therein; and
   wherein the decorative pattern and the cover form an entire outer surface of the rim;
   wherein the first rim portion comprises at least one seat in which the second rim portion is mounted;
   wherein the second rim portion comprises a first shell and a second shell; and wherein the first shell comprises a groove, and the second shell comprises a protrusion mounted in the groove.

2. The steering wheel of claim 1, wherein another part of the surface of the first rim portion has the decorative pattern.

3. The steering wheel of claim 1, further comprising the cover on the second rim portion.

4. The steering wheel of claim 1, wherein each shell comprises a bend that is mounted in each seat.

5. The steering wheel of claim 1, wherein a space is defined between the part of the surface of the first rim portion and the section rim portion.

* * * * *